(12) United States Patent
Windham

(10) Patent No.: US 7,229,029 B2
(45) Date of Patent: Jun. 12, 2007

(54) PROPULSION SYSTEM

(75) Inventor: Oscar D. Windham, Tampa, FL (US)

(73) Assignee: Phisser Technologies, Inc., Tampa, FL (US)

(*) Notice: Subject to any disclaimer, the term of this patent is extended or adjusted under 35 U.S.C. 154(b) by 74 days.

(21) Appl. No.: 10/677,800

(22) Filed: Oct. 3, 2003

(65) Prior Publication Data

US 2004/0154282 A1   Aug. 12, 2004

Related U.S. Application Data

(60) Provisional application No. 60/421,791, filed on Oct. 29, 2002.

(51) Int. Cl.
*B64D 33/00* (2006.01)
*B63H 11/00* (2006.01)
*F02K 1/00* (2006.01)

(52) U.S. Cl. .......................... 239/265.19; 239/265.43; 440/38; 60/770

(58) Field of Classification Search ........... 239/265.11, 239/265.19, 265.43, 533.13, 602, 601; 60/771, 60/770; 440/38
See application file for complete search history.

(56) References Cited

U.S. PATENT DOCUMENTS

| | | | |
|---|---|---|---|
| 2,420,323 A | 5/1947 | Meyer et al. | |
| 2,546,293 A * | 3/1951 | Berliner | 239/265.43 |
| 2,928,238 A | 3/1960 | Hawkings, Jr. | |
| 3,087,303 A | 4/1963 | Heinze et al. | |
| 3,118,468 A * | 1/1964 | Bochan | 137/846 |
| 3,285,262 A | 11/1966 | Ernst et al. | |
| 3,350,886 A | 11/1967 | Feraud et al. | |
| 3,581,995 A | 6/1971 | Fischer | |
| 3,610,556 A | 10/1971 | Charlton, Jr. | |
| 3,635,404 A | 1/1972 | Hopkins et al. | |
| 3,640,469 A | 2/1972 | Hayes et al. | |
| 3,802,376 A | 4/1974 | Smith | |
| 3,830,431 A * | 8/1974 | Schwartz | 239/265.11 |
| 4,034,696 A | 7/1977 | Kureth | |
| 4,063,685 A | 12/1977 | Jacobs | |
| 4,432,736 A | 2/1984 | Parramore | |
| 4,577,462 A * | 3/1986 | Robertson | 60/262 |
| 4,643,374 A | 2/1987 | Friederich | |
| 4,645,140 A * | 2/1987 | Bevilaqua et al. | 60/269 |
| 5,170,964 A | 12/1992 | Enderle et al. | |
| 5,735,115 A | 4/1998 | Maghon | |
| 6,159,059 A | 12/2000 | Bernier et al. | |
| 6,279,499 B1 | 8/2001 | Griffin, Sr. et al. | |
| 6,299,494 B1 | 10/2001 | Bowers et al. | |
| 6,332,816 B1 | 12/2001 | Tsuchiya et al. | |
| 6,371,407 B1 | 4/2002 | Renshaw | |

(Continued)

FOREIGN PATENT DOCUMENTS

DE         32 22 413         12/1983

(Continued)

*Primary Examiner*—Ted Kim
(74) *Attorney, Agent, or Firm*—Richard C. Litman

(57) ABSTRACT

A propulsion system for a jet- or rocket-propelled vehicle in which the resulting jet exhaust nozzle profile is a 3D spiral. The propulsion system can be applied to any jet- or rocket-propelled vehicle, including aircraft and watercraft. The propulsion system also contemplates a vehicle including the modified 3D spiral nozzle exhaust profile

4 Claims, 11 Drawing Sheets

U.S. PATENT DOCUMENTS

| | | |
|---|---|---|
| 6,382,559 B1 | 5/2002 | Sutterfield et al. |
| 2002/0049010 A1 | 4/2002 | Bernier et al. |

FOREIGN PATENT DOCUMENTS

| | | | |
|---|---|---|---|
| GB | 1 063 945 | | 2/1965 |
| GB | 2 094 252 | | 3/1981 |
| GB | 2 060 078 | | 4/1981 |
| JP | 8-19551 | * | 1/1996 |
| JP | 2000-16392 | * | 1/2000 |

* cited by examiner

PROPULSION SYSTEM

CROSS-REFERENCE TO RELATED APPLICATION

This application claims the benefit of U.S. Provisional Patent Application Ser. No. 60/421,791, filed Oct. 29, 2002.

BACKGROUND OF THE INVENTION

1. Field of the Invention

The present invention relates to a jet propulsion system. More specifically, the invention relates to a jet propulsion system having a jet or nozzle modified to produce a jet exhaust formation having a 3D spiral formation by using a slit to produce spiral exhaust for improving performance and handling, as well as reducing drag (i.e., jet and rocket engines), thereby increasing speed. The slit preferably has a generally S-shaped configuration.

2. Description of Related Art

Jet propulsion is well known in both the fields of aircraft and marine vehicles. The exhaust of these vehicles is produced by rotating power plants, such as compressors and turbines, producing thrust. The resulting exhaust leaves the nozzles of these vehicles in a generally cylindrical plume. None of the prior art, however, teaches the conversion of the exhaust from a cylindrical plume into a 3D spiral formed by a twisting ribbon. Conventional propulsion system and proposed modifications thereto are exemplified in the following publications.

U.S. Patent Publication No. 2002/0049010, published Apr. 25, 2002, teaches a steerable watercraft including a jet propelled power plant. U.S. Pat. No. 2,420,323, issued to Meyer et al. on May 13, 1947, teaches a steering system in which a jet propelled vehicle is steered in response to a set of flaps located on the nozzle exhaust. U.S. Pat. No. 2,928,238, issued to Hawkings, Jr. on Mar. 15, 1960, teaches a jet aircraft having a controllable deflector and orifice control.

U.S. Pat. No. 3,087,303, issued to Heinze et al. on Apr. 30, 1963, teaches a jet propelled aircraft with a jet deflecting means. U.S. Pat. No. 3,285,262, issued to Ernst et al. on Nov. 15, 1966, teaches an aerodynamic servo-valve for use in guidance and stabilization of rockets. U.S. Pat. No. 3,350,886, issued to Feraud et al. on Nov. 7, 1967, teaches a rocket having a stabilizing and guiding means.

U.S. Pat. No. 3,581,995, issued to Fischer on Jun. 1, 1971, teaches a device for modifying the hot exhaust gases emanated from a jet aircraft. U.S. Pat. No. 3,610,556, issued to Charlton, Jr. on Oct. 5, 1971, teaches a directional control mechanism for reaction propelled aircraft. U.S. Pat. No. 3,635,404, issued to Hopkins et al. on Jan. 18, 1972, teaches a pin stabilizing rocket nozzle.

U.S. Pat. No. 3,640,469, issued to Hayes et al. on Feb. 8, 1972, teaches a modification of a jet nozzle in which the vector of the jet is deflected about a single axis. U.S. Pat. No. 3,802,376, issued to Smith on Apr. 9, 1974, teaches a jet-propelled boat steering system. U.S. Pat. No. 4,034,696, issued to Kureth on Jul. 12, 1977, teaches a boat stabilizer.

U.S. Pat. No. 4,063,685, issued to Jacobs on Dec. 20, 1977, teaches a rocket thrust stabilizer nozzle. U.S. Pat. No. 4,432,736, issued to Parramore on Feb. 21, 1984, teaches a water-jet steering mechanism. U.S. Pat. No. 4,643,374, issued to Friederich on Feb. 17, 1987, teaches a jet propulsion steering apparatus. U.S. Pat. No. 5,170,964, issued to Enderle et al. on Dec. 15, 1992, teaches a jet-propelled nozzle thrust control.

U.S. Pat. No. 5,735,115, issued to Maghon on Apr. 7, 1998, teaches a gas turbine combustor with means for removing swirl in order to avoid turbulence. U.S. Pat. No. 6,159,059, issued to Bernier et al. on Dec. 12, 2000, teaches a thrust-controlled system for watercraft. U.S. Pat. No. 6,279,499, issued to Griffin, Sr. et al. on Aug. 28, 2001, teaches a rotational get-drive bow thruster for a marine propulsion system.

U.S. Pat. No. 6,299,494, issued to Bowers et al. on Oct. 9, 2001, teaches an articulated nozzle assembly for water jet apparatus. U.S. Pat. No. 6,332,816, issued to Tsuchiya et al. on Dec. 25, 2001, teaches a jet-propelled boat including steering control. U.S. Pat. No. 6,371,407, issued to Renshaw on Apr. 16, 2002, teaches a mechanism for vectoring jet exhaust flow. U.S. Pat. No. 6,382,559, issued to Sutterfield et al. on May 7, 2002, teaches a further jet thrust vectoring mechanism.

U.K. Patent Application No. 1,063,945, published on Feb. 22, 1965, teaches a liquid jet reaction propulsion unit. U.K. Patent Application No. 2,060,078, published on Apr. 29, 1981, teaches a flight stabilization system for rockets including spiral twist of the exhaust flow. However, the invention avoids use of an external structure to create the intended thrust flow, but rather uses modification of the internal surface of the rocket exhaust nozzle to resemble the spiral pattern obtained from a rifled gun barrel.

U.K. Patent No. 2,094,252, published on Mar. 2, 1981, teaches a water-jet steering mechanism. German Patent No. 3,222,413, published on Dec. 15, 1983, teaches a direction converter for an aircraft for controlling vertical and horizontal flight. As noted above, many patents have issued describing various jet propelled vehicles including various types of directional control systems. However, none teach the application of a slit-shaped exit to control the flow of a jet exhaust to resemble a 3D spiral. More specifically, the present invention requires the use of a slit to create a 3D spiral exhaust pattern in any jet-propelled vehicle, including jet aircraft and watercraft.

None of the above inventions and patents, taken either singly or in combination, is seen to describe the instant invention as claimed.

SUMMARY OF THE INVENTION

The present invention is a modification of the exhaust of an existing jet propelled vehicle to produce a 3 dimensional ribbon-like spiral formation. The modified 3D jet exhaust can be created either by applying an attachment to an existing structure, e.g., jet ski, or by producing a slit-like exit into the nozzle during initial production of the jet- or rocket-propelled vehicle. Furthermore, instead of the thrust being initiated in a round or cylindrical shape, the initial thrust is formed in a straight line type thrust that is then changed by the exit slit to produce 3D spiral thrust.

Accordingly, it is a principal object of the invention to provide an attachment device for modifying the exhaust from a jet nozzle into a 3D spiral formation.

It is another object of the invention to provide a jet-propelled vehicle incorporating the modifying device to produce a 3D spiral formation.

It is yet another object of the invention to provide a jet-propelled vehicle incorporating the modifying device in which the slit has a generally "elongated S"-shaped configuration.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a propulsion system for a jet- or rocket-propelled vehicle, including aircraft and watercraft. In particular, the invention is directed to a modification in which the jet propulsion exhaust exiting the jet nozzle is oriented in a 3D spiral created by an elongated S-shaped opening. The present invention may be used with any type of propulsion exhaust and is not limited to gas or water exhaust.

Figure 1A:
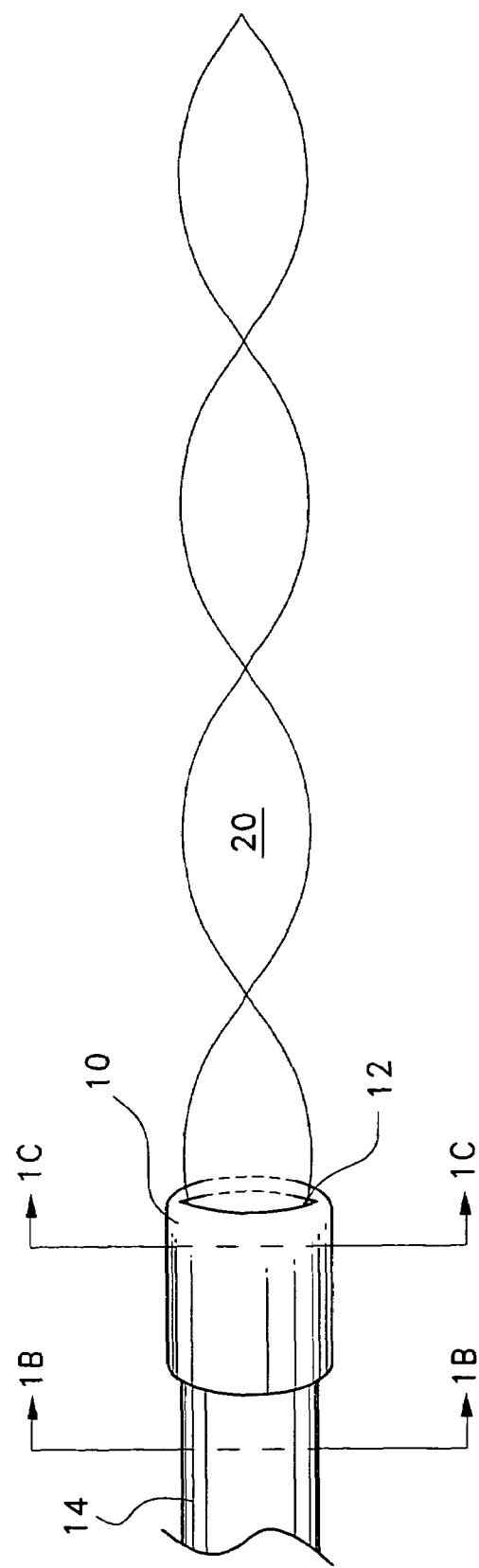
FIG. 1A is an environmental, perspective view of a jet-propulsion system according to the present invention.
Figure 1B:
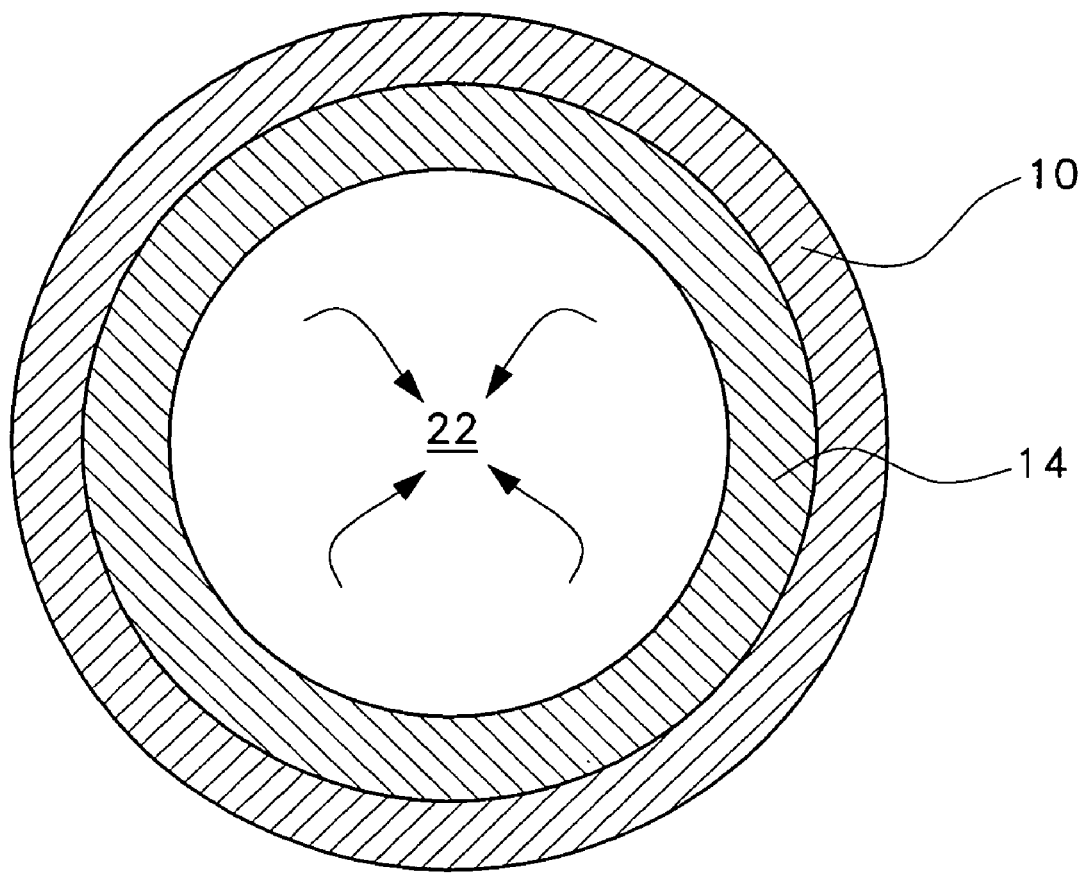
FIG. 1B is a cross-sectional view of the jet-propulsion system of FIG. 1A showing the flow through the exhaust line prior to the inventive slit.
Figure 1C:
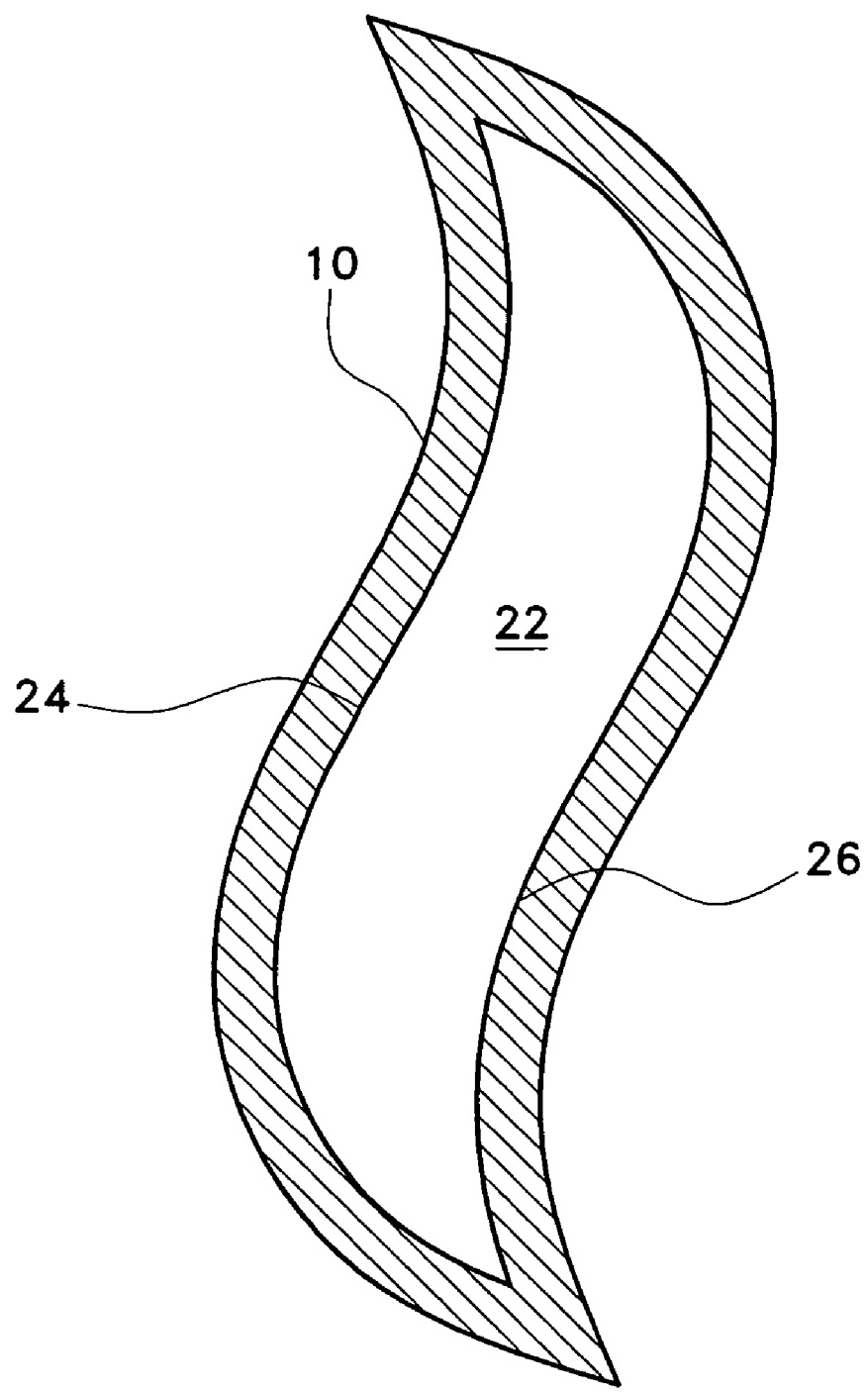
FIG. 1C is a cross-sectional view of the slit of the jet-propulsion system of FIG. 1A.

FIG. 1A shows a propulsion system of the present invention including a jet engine having a jet nozzle 14 which includes an attachment 10 applied to the nozzle 14 having a slit 12 defined therein. The flow of the jet exhaust from a conventional jet engine is typically a cylindrically shaped plume or contrail that progressively expands. The exhaust plume 20 of the present invention, however, is intended to be particularly in a 3D spiral configuration, as shown in FIG. 1A. As shown in FIGS. 1A, 1B and 1C, the exhaust nozzle 14 has been modified by the addition of an attachment 10 having a slit aperture 12 therein, thereby modifying the exhaust profile 22. This attachment would replace the typical bell-shaped cone at the end of rocket engines. At the aperture 12, the exhaust 22 exits the slit, forming the 3D spiral formation. The sides, 24 and 26, of the slit in the attachment 10 may or may not be contoured to ensure the 3D spiral exhaust profile.

Figure 1D:
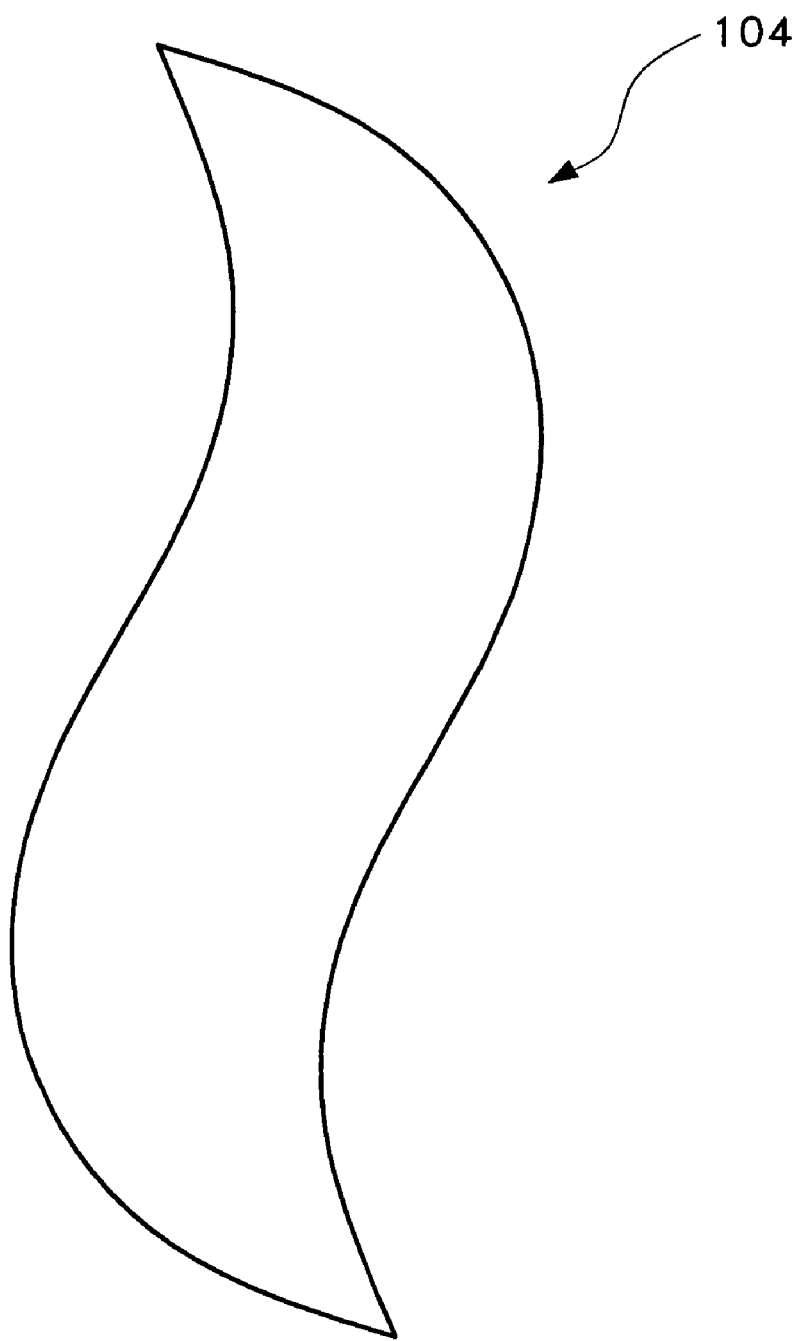
FIG. 1D is a rear view of a preferred S-shaped configuration for the slit.
Figure 1E:
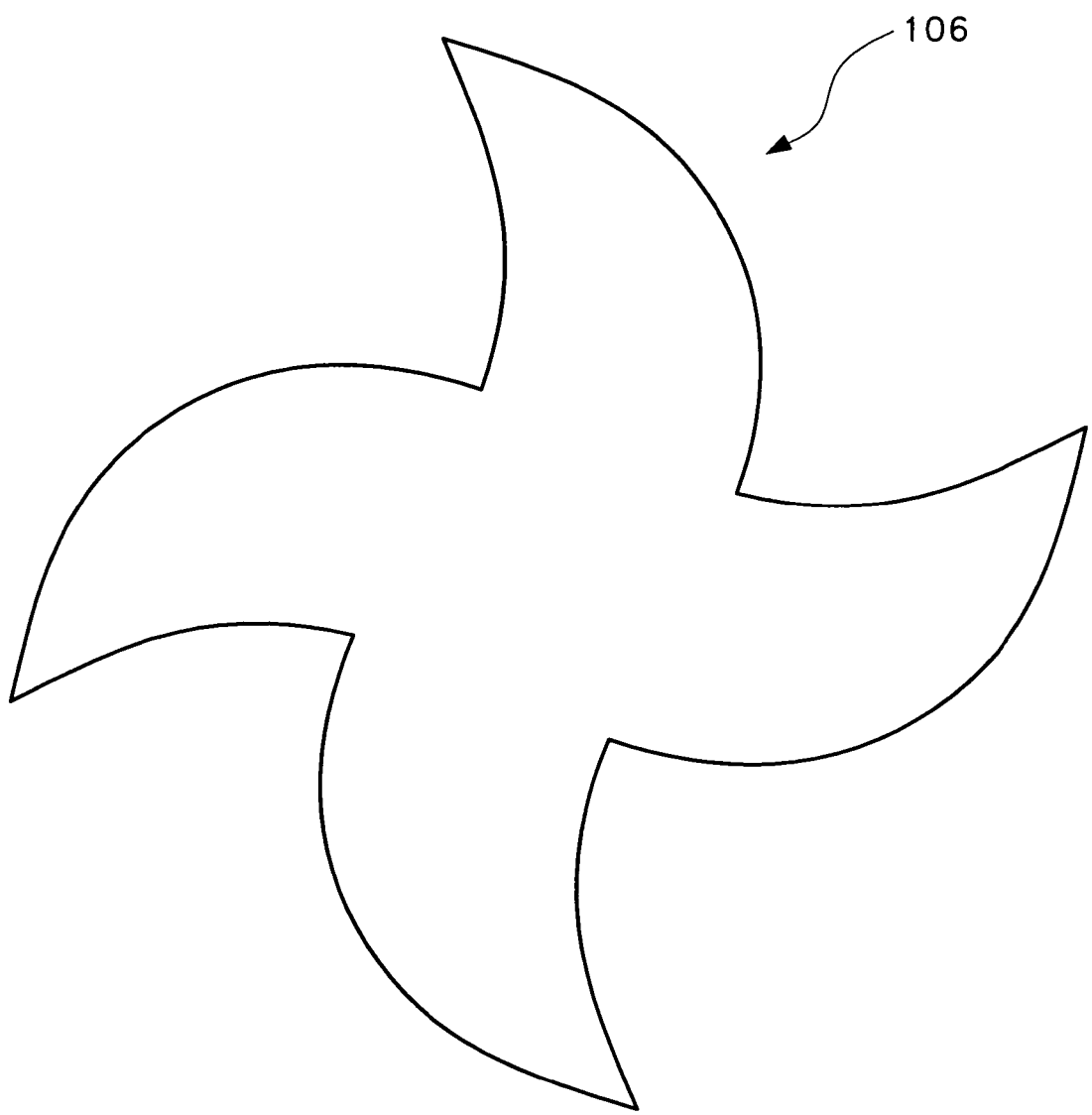
FIG. 1E is a rear view of an alternative 4-edged spiral configuration for the slit.

In all cases, the slit is preferably in the general shape of a long "S" having opposed inwardly and outwardly opposing portions. This preferred configuration is shown as the generally S-shaped slit 104 in FIG. 1D. The mirror image of this geometric configuration is also contemplated. Furthermore, a modification in which the configuration resembles the superposition of one long S-shaped slits perpendicularly onto a second S-shaped slit as shown in FIG. 1E, resulting in a four-edged spiral, is also contemplated.

Figure 2:
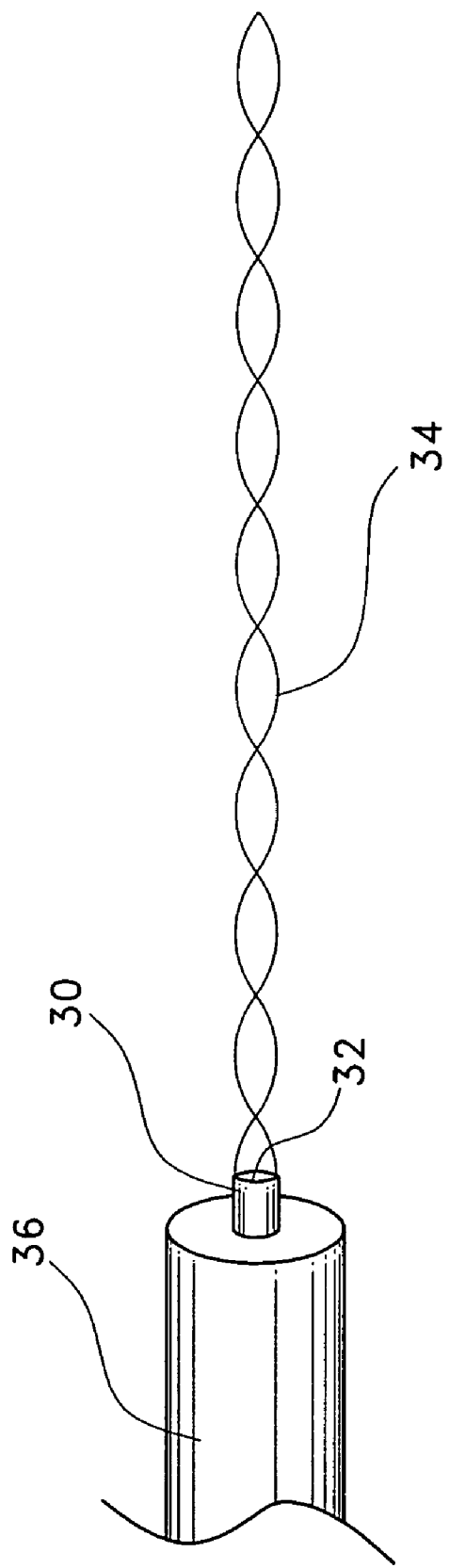
FIG. 2 is a perspective view of an alternative modification of the inventive jet-propulsion system.

FIG. 2 shows a propulsion system of the present invention in which the jet exhaust 36 of an aircraft jet or a watercraft has an exhaust profile 34 is in the form of a 3D spiral. The exhaust in this case is produced by the nozzle 30 in the jet exhaust 36. The exhaust jet 34 passes through a nozzle opening 32, which may or may not be contoured to ensure the 3D spiral exhaust formation.

Figure 3:
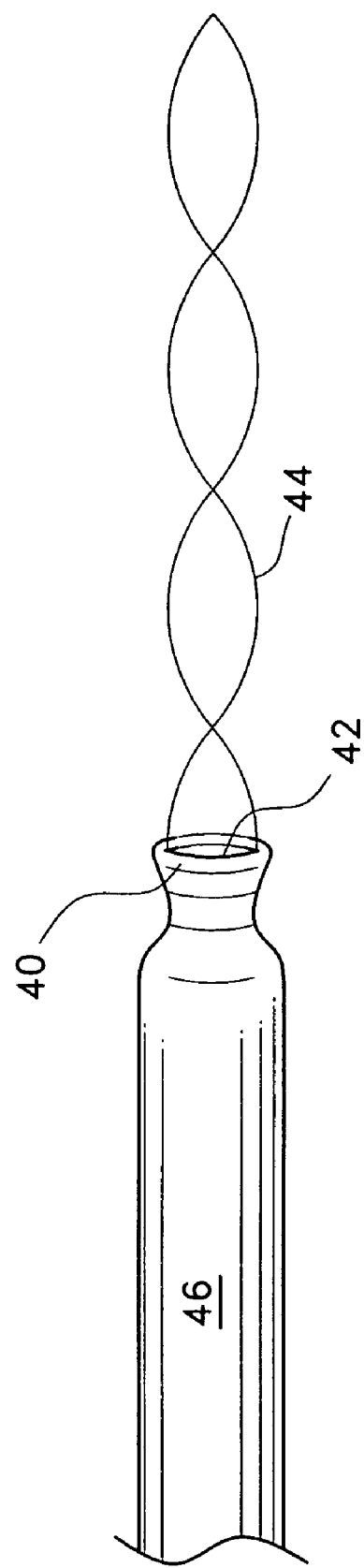
FIG. 3 is a perspective view of a modification of a rocket propulsion system in accordance with the invention.

FIG. 3 shows a modification of a rocket exhaust 46 incorporating a propulsion system according to the present invention. In this case, the propulsion system includes an aperture 42 having the general cross-section shown in FIG. 1D, in the exit nozzle 40 that creates a 3D spiral formation 44 of the exhaust.

Figure 4:
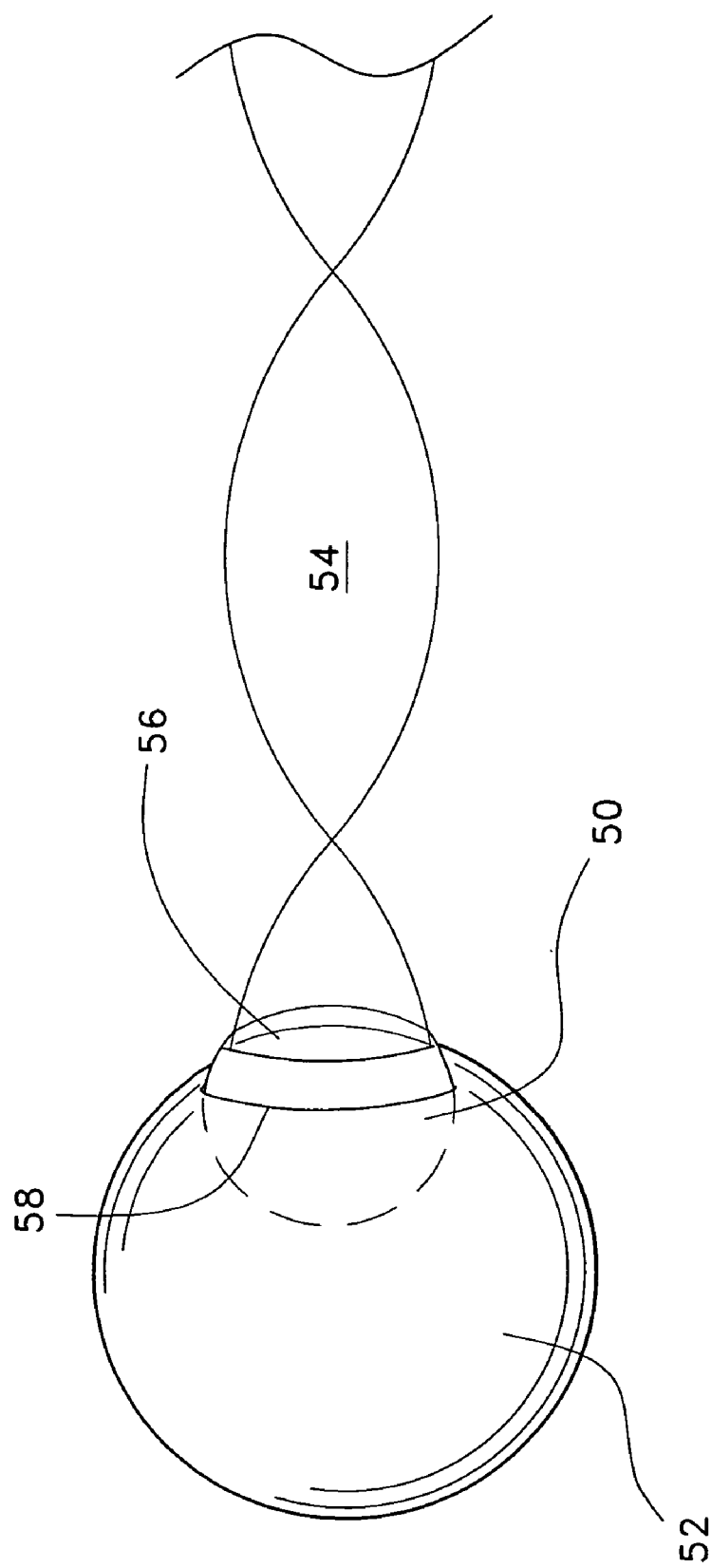
FIG. 4 is a perspective view of a propulsion system of a self-contained structure, i.e., a spherical self-propelled vehicle, according to the present invention.

FIG. 4 shows a self-propelled vehicle 52 in which the exhaust forms a 3D spiral 54 exiting the slit formation 56 from the vehicle. In this case, the slit is part of a controllable smaller sphere 50 that is controllable inside the spherical vehicle 52 using various devices known in the art. The smaller sphere is positioned inside the larger spherical vehicle and projects outward from the vehicle through opening 58. The smaller sphere 50 is rotatable 360°, thereby rotating the slit 360° about a horizontal axis. This imparts control to the flow of the exhaust. Also, the smaller sphere can be directed left or right with respect to the horizontal direction of the exhaust flow.

Figure 5:
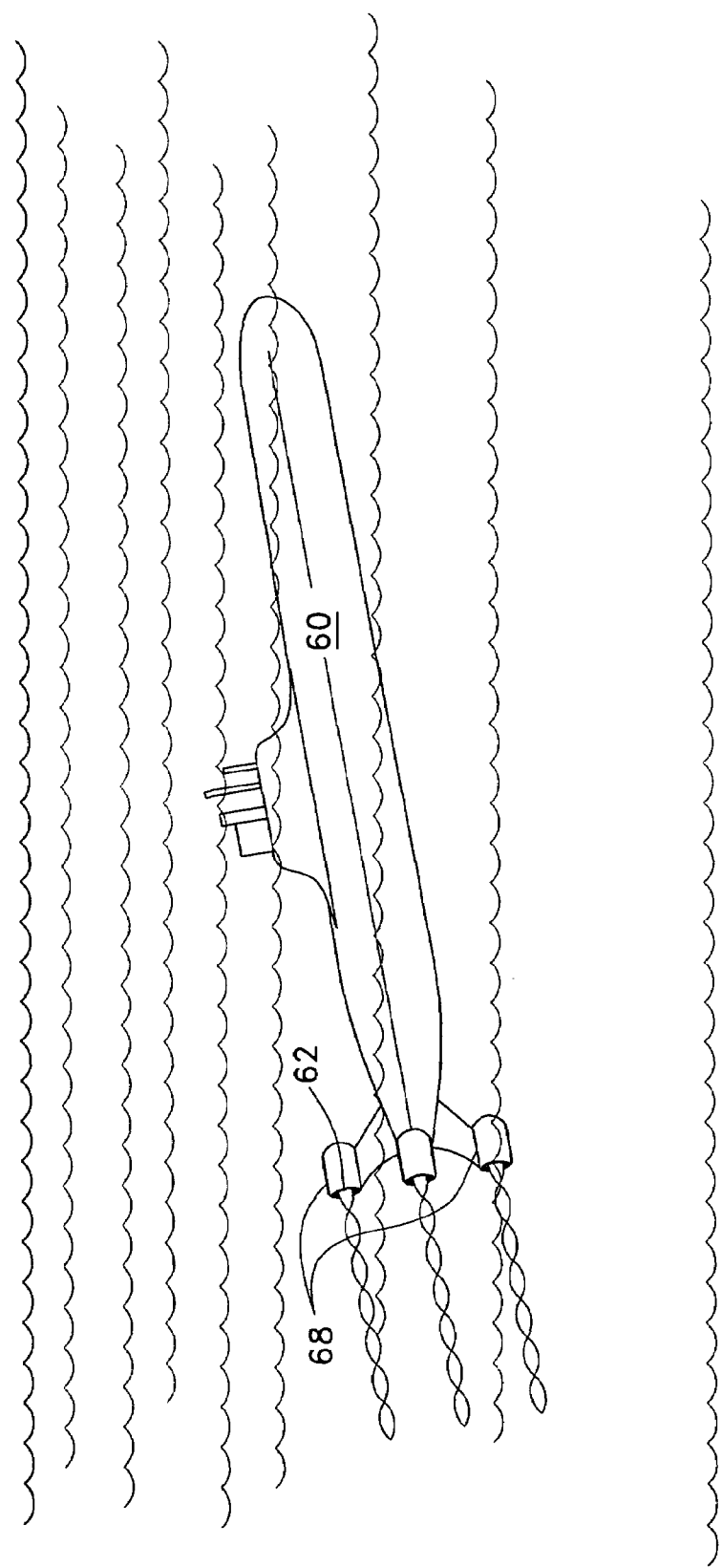
FIG. 5 is a perspective view of a propulsion system according to the present invention in a submarine.

FIG. 5 shows a version of the invention used in a submarine vehicle 60. In this case, the jet exhausts 68 are modified to create a 3D spiral formation 62.

Figure 6:
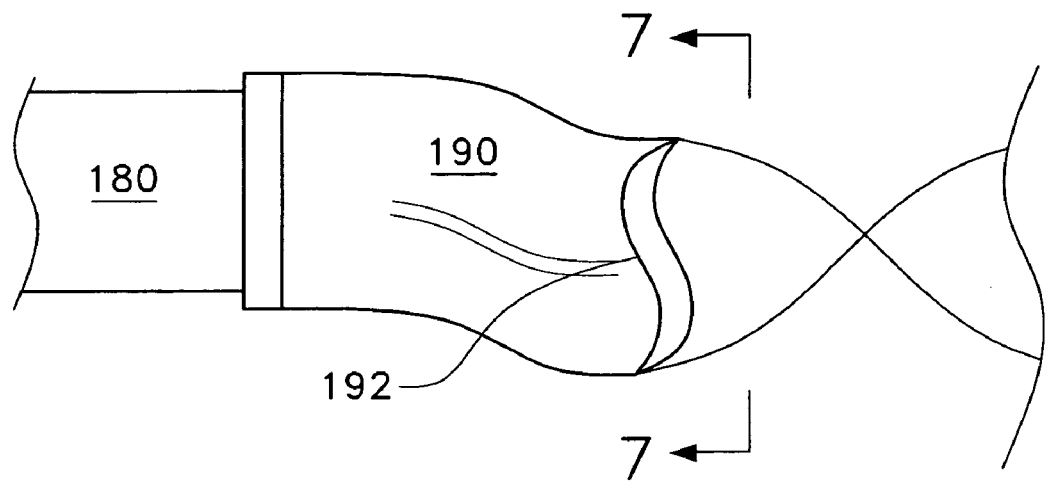
FIG. 6 is a side view of a jet ski exhaust modified to perform as a rudder.
Figure 7:
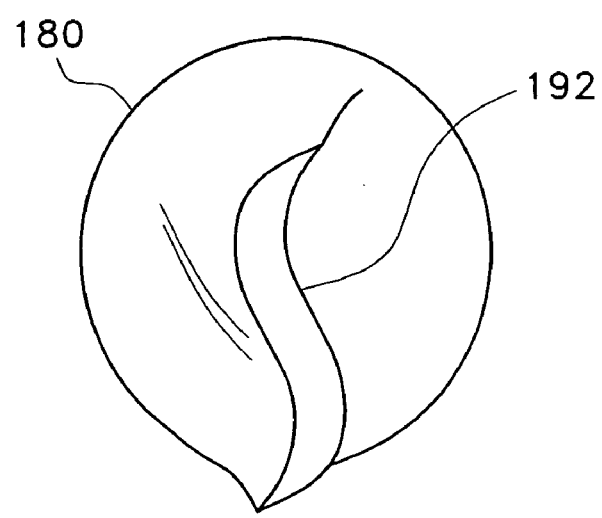
FIG. 7 is a rear view of the modification of FIG. 6.

FIG. 6 is a side view of the rear of a jet ski showing the cylindrical exhaust nozzle 180 having the modification 190 attached to it. FIG. 7 is a rear view of the slit of FIG. 6. The slit 192 in this case is shown having the generally long S-shaped configuration. Also, in this modification, the slit extends below the horizontal plane containing the central longitudinal axis of the exhaust nozzle. In this configuration, the foramen structure from which the thrust exits can be extended downward to perform as a rudder.

Figure 8:
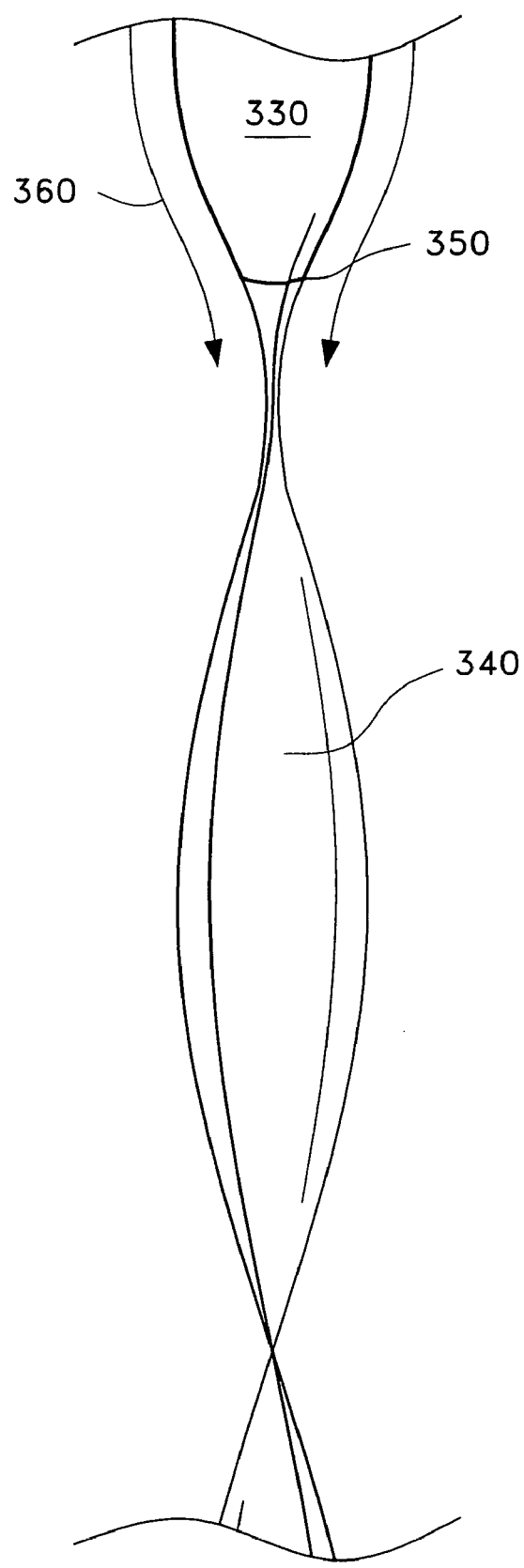
FIG. 8 is a side view of the exhaust of a rocket showing the modified exhaust plume.

FIG. 8 is a side view of a rocket nozzle 330 having the modified long S-shaped opening at 350, and the resulting 3D spiral plume 340. In this case, the drag resistance by the nozzle is reduced when compared with the original cylindrical nozzle by having the air flow 360 drawn into the space on either side of the 3D spiral exhaust 340 as shown. Speed will be increased as a result of reduced drag.

Although the invention has been discussed above to denote attachments to jet and rocket nozzles to impart the desired 3D spiral exhaust formations, the modification can equally well be incorporated into the original equipment structure of the vehicle nozzle to provide the desired 3D spiral exhaust formation. In some situations, the slit can be made flexible and form a closed slit that opens when the exhaust pressure becomes sufficient to open the slit.

One example that clarifies the principle of 3D spiral propulsion would be the male urine stream.

It is to be understood that the present invention is not limited to the sole embodiments described above, but encompasses any and all embodiments within the scope of the following claims.

I claim:

1. A propulsion system, comprising:
a vehicle engine for selectively driving a stream of propulsion fluid, whereby said vehicle engine is adapted for mounting in a vehicle, the stream of propulsion fluid being composed of a fluid through which the vehicle is moving;
a conduit connected to said vehicle engine, the stream of propulsion fluid flowing from said vehicle engine through said conduit, said conduit extending along a longitudinal axis; and
a propulsion altering attachment disposed on said conduit, the attachment having a generally elongated, open, substantially S-shaped slit having inwardly and outwardly opposing portions defined therein, said propulsion altering attachment being positioned on said conduit such that the stream of propulsion fluid flowing through the substantially S-shaped slit travels substantially along the longitudinal axis;
wherein said propulsion altering attachment and said substantially S-shaped slit are dimensioned and configured for expelling and shaping the stream of propulsion fluid flowing from said vehicle engine, and through said conduits, in a substantially three dimensional spiral pattern.

2. The propulsion system according to claim 1, wherein said vehicle engine is a jet propulsion engine.

3. A propulsion system, comprising:
a vehicle engine for selectively driving a stream of propulsion fluid, whereby said vehicle engine is adapted for mounting in a vehicle, the stream of propulsion fluid being composed of a fluid through which the vehicle is moving, the vehicle extending along a longitudinal axis;
a conduit connected to said vehicle engine, the stream of propulsion fluid flowing from said vehicle engine through said conduit, said conduit extending along the longitudinal axis; and,
a propulsion altering attachment disposed on said conduit, the attachment having a generally elongated, open, substantially S-shaped slit having inwardly and outwardly opposing portions defined therein, said propulsion altering attachment being positioned on said conduit such that the stream of propulsion fluid flowing through the substantially S-shaped slit travels substantially along the longitudinal axis, whereby said propulsion altering attachment and said substantially S-shaped slit are dimensioned and configured for expelling and shaping the stream of propulsion fluid flowing from said vehicle engine, and through said conduit, in a substantially three dimensional spiral pattern, the stream of propulsion fluid traveling substantially along the longitudinal axis is a direction parallel and opposite to the direction of motion of the vehicle.

4. The propulsion system according to claim 3, wherein the vehicle engine is a jet propulsion engine.

* * * * *